(12) United States Patent
Peres De Oliveira et al.

(10) Patent No.: US 12,500,458 B2
(45) Date of Patent: Dec. 16, 2025

(54) AXIAL-FLUX ELECTRIC MACHINE AND METHOD FOR ASSEMBLING A STATOR OF AN AXIAL-FLUX ELECTRIC MACHINE

(71) Applicant: Weg Equipamentos Elétricos S.A., Jaragua do Sul (BR)

(72) Inventors: Edson Carlos Peres De Oliveira, Jaraguá do Sul (BR); Fernando Andre Lindroth Dauner, Jaraguá do Sul (BR); Rodrigo Souza Aguiar, Jaraguá do Sul (BR); Samuel Santos Borges, Jaraguá do Sul (BR); Valmir Luis Stoinski, Jaraguá do Sul (BR)

(73) Assignee: WEG EQUIPAMENTOS ELÉTRICOS S.A, Jaragua do Sul (BR)

( * ) Notice: Subject to any disclaimer, the term of this patent is extended or adjusted under 35 U.S.C. 154(b) by 231 days.

(21) Appl. No.: 18/263,643

(22) PCT Filed: Jan. 31, 2022

(86) PCT No.: PCT/BR2022/050030
§ 371 (c)(1),
(2) Date: Jul. 31, 2023

(87) PCT Pub. No.: WO2022/160027
PCT Pub. Date: Aug. 4, 2022

(65) Prior Publication Data
US 2024/0097522 A1    Mar. 21, 2024

Related U.S. Application Data

(60) Provisional application No. 63/144,223, filed on Feb. 1, 2021.

(51) Int. Cl.
*H02K 9/19* (2006.01)
*H02K 1/18* (2006.01)
(Continued)

(52) U.S. Cl.
CPC .............. *H02K 1/182* (2013.01); *H02K 5/15* (2013.01); *H02K 5/20* (2013.01); *H02K 5/203* (2021.01);
(Continued)

(58) Field of Classification Search
CPC .......... H02K 1/20; H02K 1/2796; H02K 9/19; H02K 9/193
See application file for complete search history.

(56) References Cited

U.S. PATENT DOCUMENTS 7,345,398 B2 * 3/2008 Purvines .................. H02K 3/47
310/412
9,071,117 B2    6/2015 Woolmer
(Continued)

FOREIGN PATENT DOCUMENTS

CN    109904948    6/2019
CN    112953120    6/2021
(Continued)

OTHER PUBLICATIONS

KR 101999860 B1 Machine Translation (Year: 2019).*
(Continued)

*Primary Examiner* — Oluseye Iwarere
*Assistant Examiner* — Masoud Vaziri
(74) *Attorney, Agent, or Firm* — B. Aaron Schulman, Esq.; Stites & Harbison, PLLC

(57) ABSTRACT

The present invention relates to an axial flux electric machine (1) with a stator wound with a plurality of wound cores (8) arranged on a support disk (10), in which the support disk (10) and the plurality of wound cores (8) are encapsulated in a resin (9), in which at least one continuous coiled cooling channel (12) is formed in the resin (9), during or after the encapsulation process, on each side of the support disk (10). Each continuous coiled cooling channel
(Continued)

(12) passes close to at least one of the surfaces of each portion of the wound core (9) without touching said at least one surface.

9 Claims, 6 Drawing Sheets

(51) Int. Cl.
- *H02K 5/15* (2006.01)
- *H02K 5/20* (2006.01)
- *H02K 15/12* (2006.01)
- *H02K 15/14* (2006.01)
- *H02K 21/24* (2006.01)

(52) U.S. Cl.
CPC ............... *H02K 9/19* (2013.01); *H02K 15/12* (2013.01); *H02K 15/14* (2013.01); *H02K 21/24* (2013.01)

(56) References Cited

U.S. PATENT DOCUMENTS

| | | | |
|---|---|---|---|
| 9,287,755 B2 | 3/2016 | Woolmer et al. | |
| 2007/0210675 A1* | 9/2007 | Bender | H02K 5/203 310/268 |
| 2013/0147291 A1* | 6/2013 | Woolmer | H02K 15/02 310/58 |
| 2017/0012480 A1* | 1/2017 | Woolmer | H02K 9/197 |
| 2021/0075282 A1 | 3/2021 | Girotto et al. | |
| 2022/0247291 A1* | 8/2022 | Woolmer | H02K 3/28 |
| 2022/0286001 A1* | 9/2022 | Leijnen | H02K 1/20 |
| 2022/0368202 A1* | 11/2022 | Bossecker | H02K 5/20 |

FOREIGN PATENT DOCUMENTS

| | | |
|---|---|---|
| CN | 113964966 | 1/2022 |
| EP | 2869433 | 5/2015 |
| KR | 101999860 | 7/2019 |
| KR | 101999860 B1 * | 7/2019 |

OTHER PUBLICATIONS

International Search Report for PCT/BR2022/050030 dated May 26, 2022.

Written Opinion of the International Searching Authority for PCT/BR2022/050030 dated May 26, 2022.

International Search Report for PCT/BR2022/050031 dated May 25, 2022.

Written Opinion of the International Searching Authority for PCT/BR2022/050031 dated Feb. 25, 2022.

* cited by examiner

AXIAL-FLUX ELECTRIC MACHINE AND METHOD FOR ASSEMBLING A STATOR OF AN AXIAL-FLUX ELECTRIC MACHINE

FIELD OF INVENTION

The present invention relates to an axial flux electric machine and, more specifically, to an axial flux motor or generator.

BACKGROUND OF INVENTION

Axial electromagnetic flux electrical machines are widely known in the art, and basically comprise at least one stator and at least one disk-shaped rotor with permanent magnets in which the electromagnetic flux travels in the axial direction of the rotating shaft of the machine. They can comprise both electric motors and electric generators.

In one of the known solutions for cooling axial flux motors, an external pump pumps coolant fluid into the motor (preferably inside the housing and/or stator), so that the fluid can extract heat from the motor. The greater the heat extraction capacity, the greater the power density at which the motor can work.

Thus, it is known from the state of the art to form cooling channels for the passage of the coolant fluid through the internal components of the engine.

Document EP2606561, for example, shows an electrical machine with an annular chamber through which a cooling medium can circulate around the stator coils.

Document KR101999860, in turn, discloses an electric motor with a cooling solution comprising a coolant distribution chamber that includes a portion of the introduced coolant fluid and a second coolant fluid distribution path to guide another portion of the coolant fluid to the side of the rear cap.

Document WO2019/171318 discloses a cooling component for an electric motor comprising a channel defined by an outer ring, an inner ring concentric to the outer ring and linear segments extending radially from the inner ring towards the outer ring.

OBJECTIVES OF THE INVENTION

It is one of the objectives of the present invention to provide an axial flux electric machine with a high efficiency cooling system of thermal exchange.

It is a further object of the present invention to provide an electrical axial flux machine in a compact configuration.

It is another objective of the present invention to provide a method of assembling a stator for an axial flux electrical machine, which method allows the creation of a compact assembly that integrates the cooling functionality.

SUMMARY OF INVENTION

The present invention relates to an axial flux electrical machine comprising a housing and at least one inlet port and at least one outlet port for the coolant fluid, and an active core comprising a rotor and a wound stator, wherein the wound stator comprises a plurality of wound cores arranged on a support disk. Each of the plurality of wound cores is a split wound core comprising two core parts, each core part being disposed on one side of the support disk, the support disk being positioned in correspondence with the at least one inlet and at least one outlet of coolant from the housing. The two core parts of each split wound core can be joined together by means of adhesives, latches or otherwise.

The support disk and the plurality of wound cores are encapsulated using a resin, with at least one continuous coiled channel being formed in the resin, during the encapsulation process, on each side of the support disk. Each continuous coiled cooling channel passes close to at least one of the surfaces of each part of the core, without touching directly on said at least one of the surfaces, ensuring isolation between the cooling fluid and the wound cores.

In one embodiment of the invention, after the process of encapsulating, in a resin, the support disk and the plurality of wound cores, a closing plate is disposed on each corresponding side of the resin, sealing each continuous coiled cooling channel formed in the resin. Each closing plate can be joined on each corresponding side of the resin. Each continuous coiled cooling channel can be a zigzag cooling channel.

In one embodiment of the invention, the maximum spacing between the continuous coiled cooling channel and said at least one of the surfaces of each core part is from 0 to 10% of the external diameter of the support disk, more specifically from 0% to 3% of the external diameter of the support disk.

The present invention also relates to a method for assembling a stator of an axial flux electrical machine, in which the stator comprises a plurality of wound cores arranged on a support disk, the method comprising:
- mounting a first split coil onto a first split core part;
- fitting the assembled first split coil and first core part to one side of the support disk;
- positioning a second split coil on the other side of the support disk;
- mounting a second split core part on the second split core part and joining the second split core part on the first split core part, forming each wound core of the plurality of wound cores;
- repeating the above steps for all wound cores of the plurality of wound cores;
- housing the stator in a mold-type device;
- encapsulating the housed stator using a resin and forming, during the encapsulation process, at least one continuous coiled cooling channel on each side of the support disk; and
- placing a closing plate over the resin on each side of the support disk, sealing the continuous coiled cooling channel formed on each corresponding side of the support disk.

In one embodiment of the method of the present invention, the step of arranging a closing plate over the resin material on each side of the support disk comprises applying an adhesive to the resin on each side of the support disk and joining each closing plate over the resin on each corresponding side of the support disk. Furthermore, the step of forming, during encapsulation, at least one continuous coiled cooling channel on each side of the support disk uses a mold during the addition of the resin.

BRIEF DESCRIPTION OF THE DRAWINGS

The present invention will be described below in more detail, with reference to the attached drawings, in which.

DETAILED DESCRIPTION OF THE INVENTION

Figure 1:
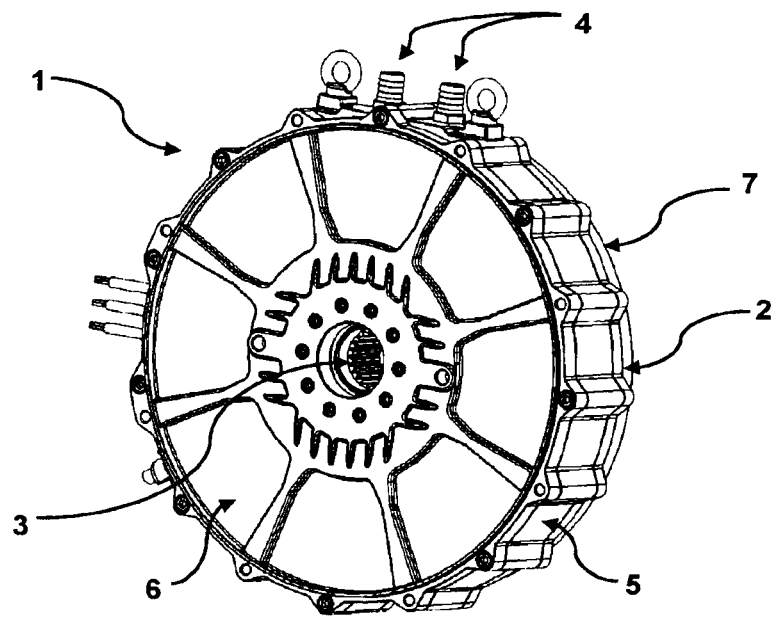
FIG. 1—is a perspective view of an axial flux electric machine according to an embodiment of the present invention.

FIG. 1 shows an axial flux motor according to an embodiment of the present invention.

Although the present invention is described incorporated in an electric motor, it should be understood that the solution of the present invention could be equally applied to other axial flux electrical machines, such as axial flux generators.

As can be seen in FIG. 1, the motor 1 comprises a housing 2 with a central through hole 3 and coolant inlet and outlet holes 4. The through hole 3 is intended for receiving a shaft, however, it should be understood that in other embodiments of the invention, the shaft could be integrated into the motor.

In the embodiment of the invention shown in the figures, the housing 2 is formed by a body part 5, a front cap 6 and a rear cap 7. However, it should be understood that the housing could be formed differently, for example as a split housing, with the split body part, with each half integrally formed to a respective closure cap.

Figure 2:
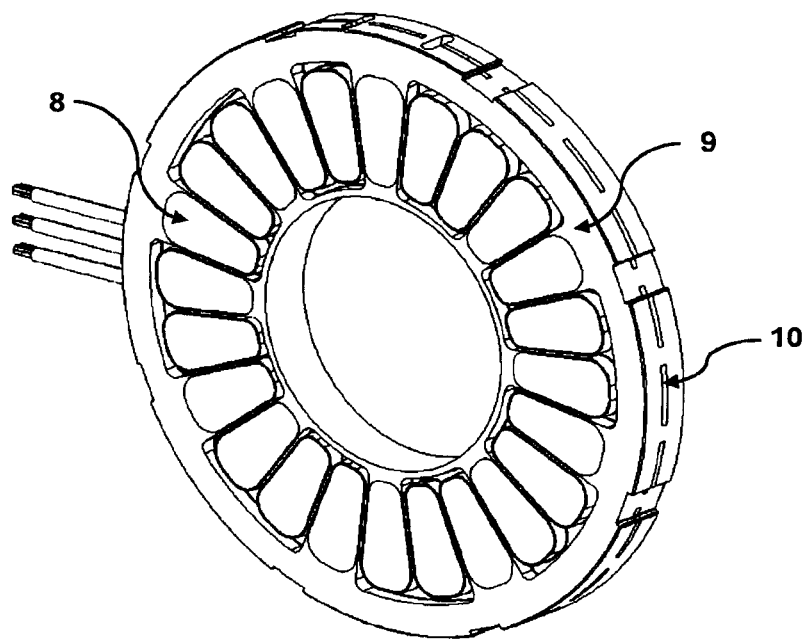
FIG. 2—is a perspective view of a stator component of an axial flux electrical machine according to an embodiment of the present invention.
Figure 3:
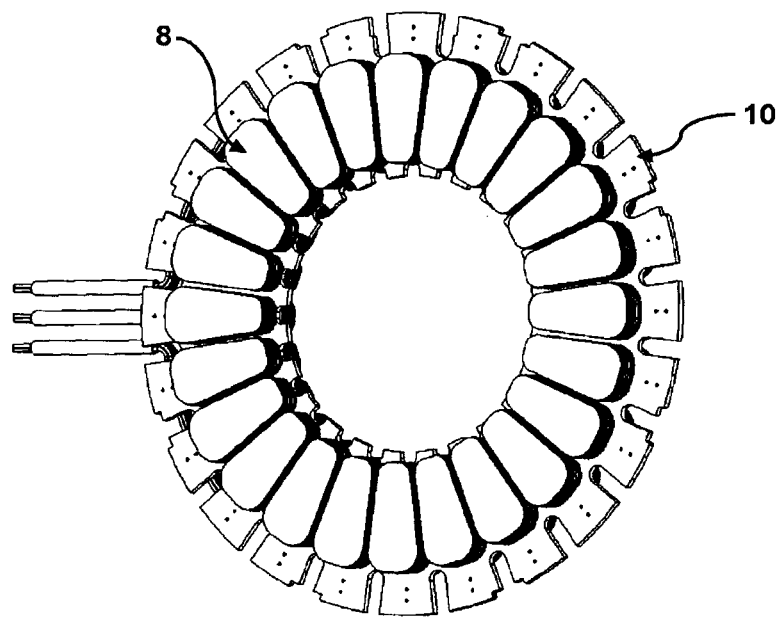
FIG. 3—is a perspective view of a stator component of an axial flux electrical machine according to an embodiment of the present invention, the resin being removed.

FIGS. 2 and 3 show a perspective view of the wound stator of the motor according to an embodiment of the present invention. FIG. 2 shows a plurality of wound cores 8 surrounded by a resin 9. In one embodiment of the present invention, the resin is a high thermal conductivity epoxy resin. However, one skilled in the art would understand that the present invention would achieve equivalent effect with a suitable thermosetting material.

The plurality of wound cores 8 are mounted on a support disk 10, best illustrated in FIG. 3. The support disk assists in the positioning of the magnetic core, keeping the plurality of wound cores correctly positioned during motor manufacture and operation, and transmits touch to the motor housing. In one embodiment of the invention, the support disk 10 is a support disk in the central region of the stator.

In a preferred embodiment of the invention, the disk 10 is made of a low density electrically non-conducting material, such as resin-bonded fiberglass, capable of withstanding high temperatures, such as over 200° C. without losing structural properties and dielectric strength. It should be understood, however, that the disk 10 could be manufactured from other suitable materials such as carbon fiber, BMC or polyamide.

In one embodiment of the present invention, the support disk 10, in addition to ensuring the rigidity of the system, also assists in extracting heat from the engine according to the present invention.

Figure 4:
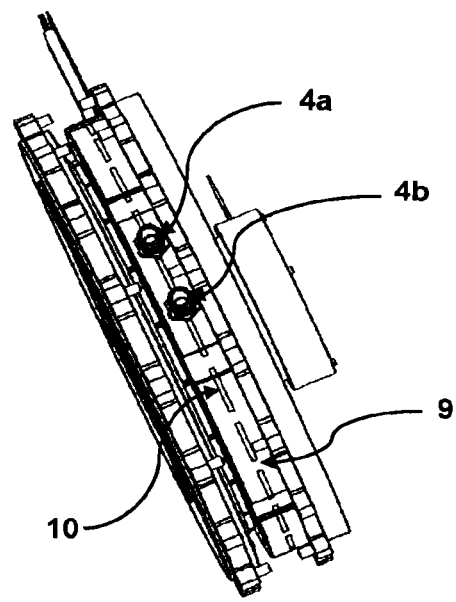
FIG. 4—is a perspective view of an axial flux electric machine according to an embodiment of the present invention, the central part of the housing being removed.
Figure 5:
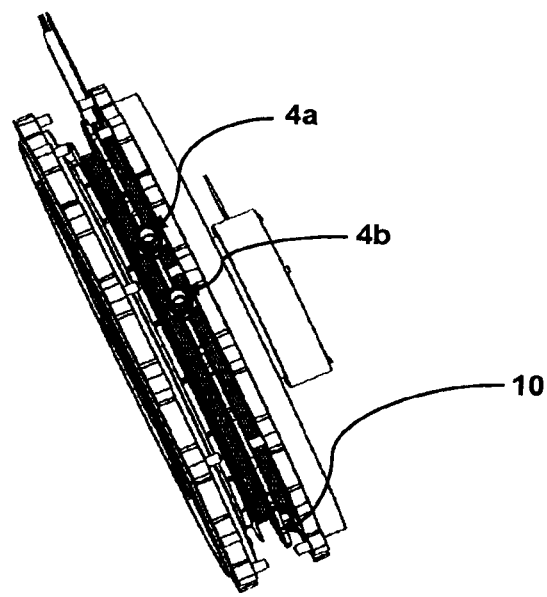
FIG. 5—is a perspective view of an axial flux electric machine according to an embodiment of the present invention, the central part of the housing and the resin being removed.

FIGS. 4 and 5 better illustrate this functionality of the support disk 10. FIG. 4 shows the motor without the central part of the housing and FIG. 5 shows the same view without the resin 9.

As illustrated in FIGS. 4 and 5, the support disk 10 is positioned in correspondence with the coolant inlet and outlet 4a and 4b, in such a way that the coolant that enters through the fluid inlet 4a is divided to the two sides of the disk 10, front and rear sides of the engine.

In one embodiment of the present invention, the plurality of wound cores are mounted on the disk 10 so as to form a wound core split by the disk.

Figure 6:
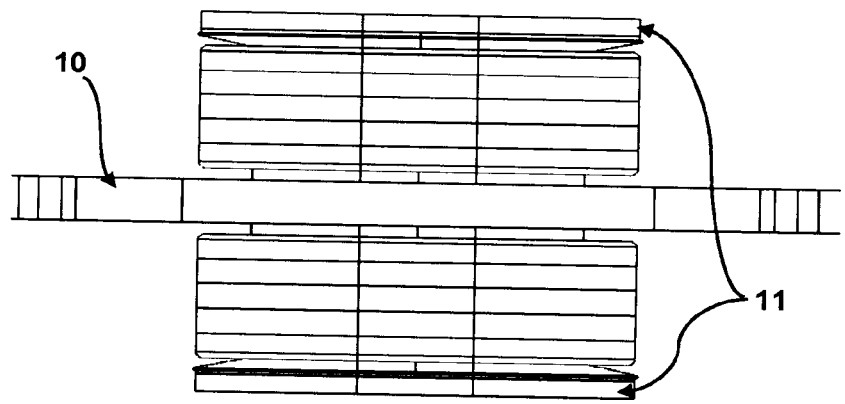
FIG. 6—is a schematic illustration of the wound core component of an axial flux electric machine according to an embodiment of the present invention.

Thus, as best illustrated in FIG. 6, each of the plurality of wound cores comprises two core parts 11 joined by adhesive, latching or any other suitable means.

As mentioned previously, the wound cores and the disc are encapsulated in a resin 9. In order to aid cooling of the core, cooling channels 12 are formed in the resin present on each side of the disk 10.

The motor is assembled by assembling a first split coil on a first split core part, followed by fitting the first set of coil and core part onto the support disk. Then a second coil is positioned over the other side of the support disk and a second split core part is attached to the first assembly. Then, the first and second core parts are joined together. After all assemblies are positioned on the support disk, the stator is housed in a mold-type device.

After housing the stator, its resin encapsulation occurs, and the cooling channels 12 are preferably formed during the encapsulation process. For this purpose, cooling channels are formed in the mould.

Naturally, a person skilled in the art would understand that the formation of cooling channels in the resin after encapsulation is possible. The option of forming during encapsulation, however, makes the process of forming channels 12 less complex, more accurate and more economical.

The cooling channels 12 are preferably formed as a continuous coiled channel, so that the channel parts pass in proximity to at least one of the side surfaces of each coil, so as to be adjacent to at least one surface of the wound core, but without direct contact with such surface. In a preferred embodiment of the invention, the maximum spacing between the channel and the coil surface is from 0 to 10% of the external diameter of the support disk 10, more preferably from 0 to 3% of the external diameter of the support disk 10.

The cooling channels 12 can be formed by a continuous coiled channel that has one or more divisions, preferably the connection between the radially outer portion 12a to the wound core 8 and the radially inner portion 12b to the wound core 8 is made in pairs 12c.

Figure 7:
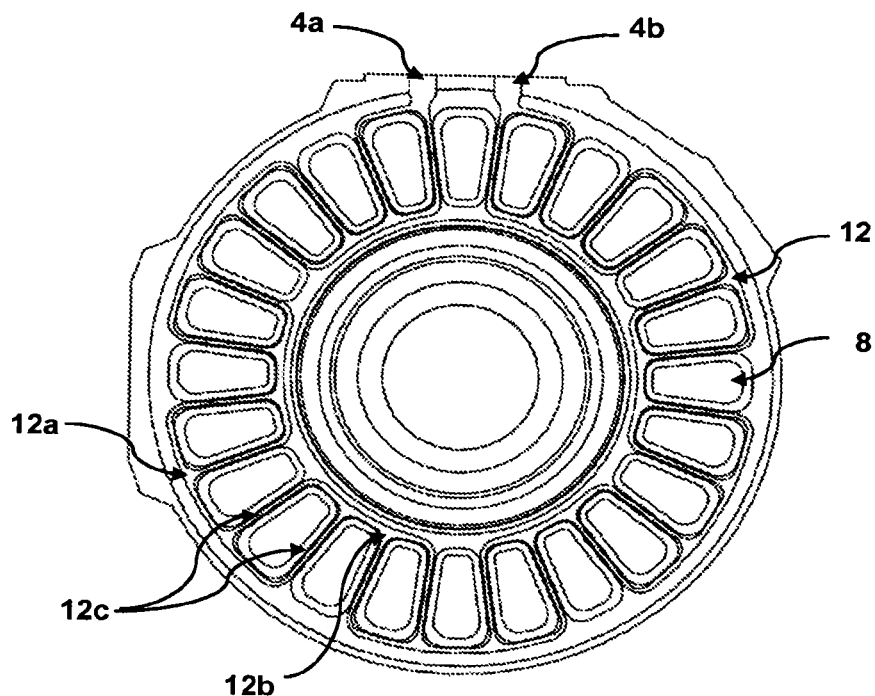
FIG. 7—is a schematic illustration of an embodiment of the cooling system of an axial flux electric machine according to an embodiment of the present invention.

In the embodiment of the invention shown in FIG. 7, the cooling channel 12 starts at the fluid inlet 4a coiled in a continuous zigzag fashion adjacent to the wound cores 8 and continues to the fluid outlet 4*b*.

The fluid must be pumped to the engine, when entering the engine through the inlet, the fluid will flow through the channels, and consequently the fluid will extract heat from the regions close to the channel wall due to the convection phenomenon, and after circling the wound cores, the heated fluid will leave the engine through output 4*b*, where it will need to pass through a heat exchanger to dissipate the heat that was extracted from the engine to the environment.

For axial closing of the wound core and containment of the cooling fluid, closing plates are used.

FIGS. 8 to 11 better illustrate this feature of the present invention.

Figure 8:
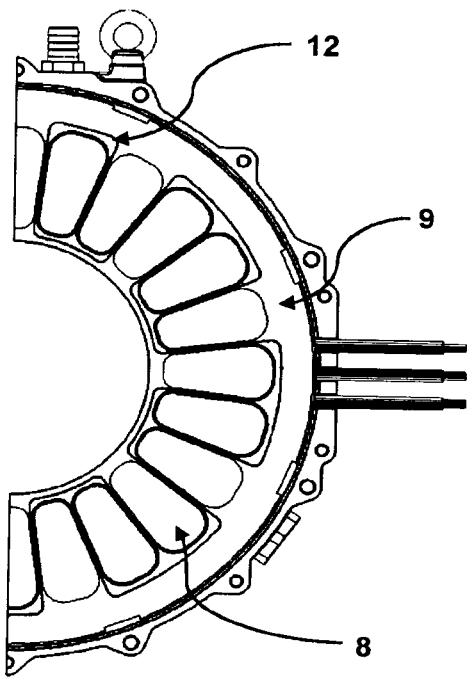
FIG. 8—is a cross-sectional view of an axial flux electrical machine according to an embodiment of the present invention, with the housing, rotor and shaft components having been removed to visualize a stator component.

FIG. 8 shows a sectional view of the motor without the front cap, rotor and closing plate. In FIG. 8 it is possible to visualize the wound cores 8 encapsulated in the resin 9 and the continuous cooling channel 12.

Figure 9:
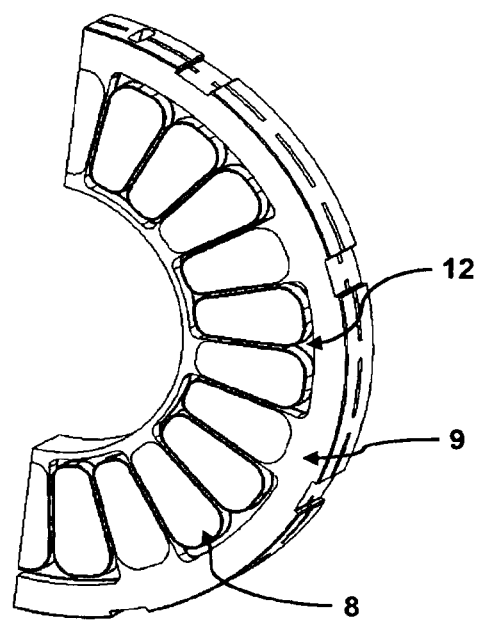
FIG. 9—is a cross-sectional view of a stator component of an axial flux electrical machine according to an embodiment of the present invention.
Figure 10:
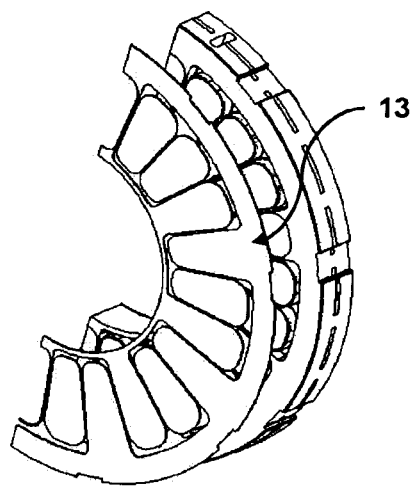
FIG. 10—is a sectional view of a stator component of an axial flux electric machine according to an embodiment of the present invention.
Figure 11:
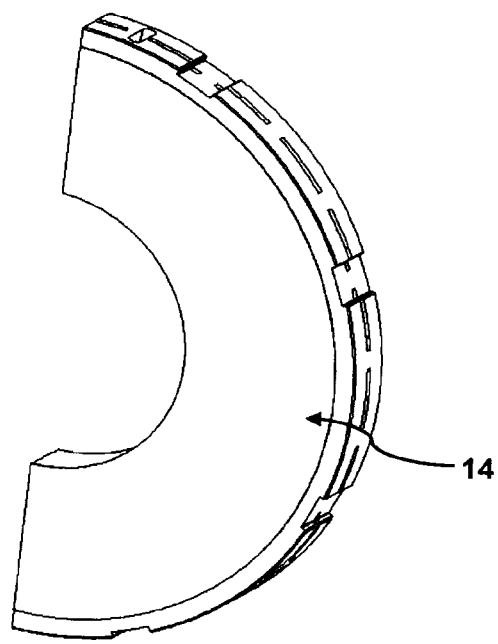
FIG. 11—is a cross-sectional view of a stator component of an axial flux electrical machine according to an embodiment of the present invention.

FIG. 9 shows the wound cores 8, resin 9 and continuous cooling channel 12. As best seen in FIGS. 10 and 11, to close the set, an adhesive 13 is applied on the encapsulation of the resin (after the end of the manufacturing process of the channels), and the closing plate 14 is joined. FIG. 10 schematically shows the layer of adhesive 13 separately and FIG. 11 shows the closing plate 14 positioned on one side of the stator.

Thus, the closing plates 14 seal the cooling channels 12 on each side of the stator. Closing plate 14 is preferably made of fiberglass with epoxy resin. However, in embodiments of the invention, other suitable materials could be used, such as, for example, carbon fiber, BMC or polyamide.

A closing plate 14 is provided on each side of the stator, one at the front and one at the rear. The impeller is mounted axially spaced from the closing plates 14.

Although examples of embodiments of the present invention have been described, it should be understood that the scope of the present invention covers other possible variations of the described inventive concept, being limited only by the content of the claims only, including the possible equivalents.

The invention claimed is:

1. An axial flux electrical machine comprising a housing and at least one inlet port and one outlet port for coolant, and an active core comprising at least one rotor and at least one wound stator, wherein the wound stator comprises a plurality of wound cores arranged on a support disk, and wherein:
    each of the plurality of wound cores is a split wound core comprising two core parts, each core part being disposed on one side of the support disk; and
    the support disk is positioned in correspondence with the at least one inlet and at least one outlet for coolant fluid of the housing; and
    the support disk and the plurality of wound cores are encapsulated in a resin, whereby at least one continuous coiled cooling channel is directly integrated in the resin due to being formed, during the encapsulation process, on each side of the support disk; each continuous coiled cooling channel passes close to at least one of the surfaces of each wound core part, without touching said at least one of the surfaces.

2. The machine according to claim 1, wherein after encapsulating the support disk and the plurality of wound cores using a resin, a closing plate is arranged on each corresponding side of the resin, thus sealing each continuous coiled cooling channel-formed in the resin.

3. The machine according to claim 1, wherein each continuous coiled cooling channel is a zigzag cooling channel.

4. The machine according to claim 1, wherein the maximum spacing between the at least one continuous coiled cooling channel and said at least one of the surfaces of each wound core part is from 0 to 10% of the external diameter of the support disc.

5. The machine according to claim 4, wherein the maximum spacing between the at least one continuous coiled cooling channel and said at least one of the surfaces of each wound core part is 0 to 3% of the external diameter of the support disk.

6. The machine according to claim 1 wherein the at least one cooling channel comprises at least one division, such that a radially outer channel portion to the wound core and a radially inner channel portion to the wound core are connected by a pair of channel connecting portions.

7. A method for assembling a stator of an axial flux electrical machine, in which the stator comprises a plurality of wound cores arranged on a support disk, the method comprising:
    mounting a first split coil on a first split core part;
    fitting the assembled first split coil and first core part to one side of the support disk;
    positioning a second split coil on the other side of the support disk;
    mounting the second split coil to the second split core part and joining the second split core part to the first split core part, forming each wound core of the plurality of wound cores;
    repeating the above steps for all wound cores of the plurality of wound cores;
    housing the stator in a mold type device;
    encapsulating the stator housed in the mold type device in a resin and forming, during the encapsulation process, at least one continuous coiled cooling channel on each side of the support disk; and
    arranging a closing plate over the resin on each side of the support disk, sealing the at least one continuous coiled cooling channel formed on each corresponding side of the support disk.

8. The method according to claim 7, wherein arranging a closing plate on the resin on each side of the support disk comprises applying an adhesive to a resin on each side of the support disk and joining each closing plate on the resin on each corresponding side of the support disk.

9. The method according to claim 7, further comprising forming, during the encapsulation process, at least one cooling channel.

* * * * *